United States Patent Office 2,993,884
Patented July 25, 1961

2,993,884
METAL COMPLEXES OF MONOAZO-DYESTUFFS
Rudolf Ruegg, Basel, and Hans Wilhelm Liechti, Oberwil, Switzerland, assignors to Ciba Limited, Basel, Switzerland
No Drawing. Filed Jan. 12, 1959, Ser. No. 786,011
Claims priority, application Switzerland Feb. 6, 1958
5 Claims. (Cl. 260—147)

The present invention is based on the observation that valuable new metal complexes of monoazo-dyestuffs are obtained by treating with an agent yielding copper a monoazo-dyestuff of the formula (1)

$$A_1-C=C-N=N-R$$
$$alk-N\diagdown_N\diagup C=O$$
$$\quad\quad|$$
$$\quad\quad A_2$$

in which $A_1$ and $A_2$ each represents an alkyl or benzene radical free from acid groups imparting solubility in water, R represents a 4-hydroxyquinolone-(2)-radical which is free from acid groups imparting solubility in water and is bound in 3-position to the azo linkage, and "alk" represents an alkyl group.

The azo-dyestuffs of Formula 1 can be prepared by coupling a diazo-compound of an amine of formula with a 4-hydroxyquinolone-(2).

(2)

$$A_1-C=C-NH_2$$
$$alk-N\diagdown_N\diagup C=O$$
$$\quad\quad|$$
$$\quad\quad A_2$$

In the diazo-components of Formula 2, $A_1$ and $A_2$ represent alkyl radicals, which preferably contain at most 5 carbon atoms, or benzene radicals which are free from acid groups imparting solubility in water, and may advantageously be substituted by halogen atoms or alkyl or alkoxy groups, "alk" represents an alkyl radical, which preferably contains at most 4 carbon atoms, for example, a methyl group.

The 4-hydroxyquinolones-(2) suitable as coupling components preferably correspond to the formula

[structure with OH, A ring, N, $R_1$, =O]

in which $R_1$ represents a hydrogen atom or preferably a lower alkyl radical, for example, a methyl, ethyl, propyl or butyl radical. If desired, the benzene nucleus A may further contain a substituent free from acid groups imparting solubility in water, for example, a halogen atom, or an alkoxy, alkyl or nitro group.

Suitable agents yielding copper are preferably the salts of copper, for example copper acetate, and above all copper sulfate.

The coppering may be carried out by a method in itself known, advantageously at a raised temperature, under atmospheric or superatmospheric pressure, for example at the boiling temperature of the reaction mixture, if desired, in the presence of a suitable additive, for example, in the presence of a salt, an organic acid, a base, an organic solvent or other substances that promote the formation of complexes. It is especially advantageous to carry out the metallization in aqueous acetic acid, more especially acetic acid of 800% strength.

The metalliferous dyestuffs of this invention are easily soluble in water, and more soluble than the metal-free parent dyestuffs used for making them. They are suitable for dyeing or printing a very wide variety of materials, for example, animal fibers such as silk, hair and leather, vegetable fibers such as ordinary or tannin-treated cotton, cellulose acetate rayon, and above all for dyeing polyacrylonitrile fibers tints that are very fast to light.

The following examples illustrate the invention, the parts and percentages being by weight unless otherwise indicated.

*Example 1*

In the course of 30 minutes 3.7 parts of the dyestuff of the formula $$H_3C-C=C-N=N-\text{[quinolone-OH]}$$
$$H_3C-N\diagdown_N\diagup C=O$$
$$\quad\quad|\quad\quad\quad\quad\quad\quad O=\text{[N-ring]}$$
$$\quad\quad CH_3\quad\quad\quad\quad CH_2-CH_2-CH_2-CH_3$$

are added in small portions at 90° C. to a hot solution of 2 parts of copper acetate in 50 parts of acetic acid of 80% strength.

The mixture is stirred for 3 hours under reflux and then evaporated to dryness on a boiling water bath. In this manner the copper complex is obtained in the form of a dark-olive resin which readily dissolves in water with intense yellow coloration and dyes polyacrylonitrile fibers fast yellow tints from an acetic acid bath.

1:2:3-trimethyl-4-aminopyrazoline-(5) is obtained by nitrosation and subsequent reduction with zinc dust of the known 1:2:3-trimethylpyrazoline-one-(5) in an aqueous solution. The base dissolves extremely readily in water; it is easy to isolate with salicyl aldehyde in the form of its yellow azomethine of the formula $$H_3C-C=C-N=CH-\text{[benzene]}$$
$$H_3C-N\diagdown_N\diagup C=O$$
$$\quad\quad|\quad\quad\quad\quad\quad HO-\text{[ring]}$$
$$\quad\quad CH_3$$

melting at 202° C. When the azomethine is boiled for a short time with aqueous hydrochloric acid, it is split up. When the salicyl aldehyde has been distilled off with steam, and the hydrochloric acid distillation residue cooled to 0° C., the latter can be used as it is for the diazotization with aqueous sodium nitrite solution. The aqueous solution of the diazonium salt is then coupled with a solution, rendered alkaline with sodium carbonate, of N-n-butyl-4-hydroxyquinolone-(2).

*Example 2*

The dyestuff of the formula $$H_3C-C=C-N=N-\text{[quinolone-OH]}$$
$$H_3C-N\diagdown_N\diagup C=O$$
$$\quad\quad|\quad\quad\quad\quad\quad\quad O=\text{[N-ring]}$$
$$\quad\quad CH_3\quad\quad\quad\quad\quad\quad\quad CH_3$$
$$\quad\quad CH_2-CH_2-CH_2-CH_3$$

is coppered as described in Example 1, whereupon a copper complex having similar properties to that of the said example results.

The 1-n-butyl-2:3-dimethyl-4-aminopyrazolin-one-(5) required in the above reaction can be prepared like the 1:2:3-trimethyl-4-aminopyrazolin-one-(5). First, 1-n-butyl-3-methylpyrazolone-(5) known from U.S. Patent No. 2,715,120 patented August 9, 1955 by Rudolf Ruegg et al. is converted into 1-n-butyl-2:3-dimethyl-pyrazolinone-(5) by being heated for 24 hours with dimethyl sulfate to 175° C., and then nitrosation and reduction of the nitro group are carried out.

Example 3

2.6 parts of copper sulfate are dissolved in 100 parts of hot water, and this solution is treated in the course of ½ hour at 70° C. with 4 parts of the dyestuff of the formula

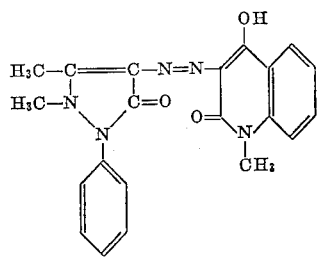

in small portions. The mixture is stirred for 2 hours under reflux at the boil, and an intensely yellow solution is obtained. While this solution is still hot, a small amount of insoluble matter is filtered off and the filtrate is then allowed to cool to room temperature in the course of several hours.

The copper complex, which crystallizes out in the form of orange-brown flakes, is filtered off, washed with a small amount of cold water and dried. The dyestuff dissolves readily in hot water with intensely yellow coloration and dyes polyacrylonitrile fibers from an acetic acid bath yellow tints of outstanding fastness to light and heat.

To prepare the parent dye, a diazo solution prepared in the conventional manner from aminoantipyrine is coupled with a solution, rendered alkaline with sodium carbonate, of 1-methyl-4-hydroxyquinolone-(2).

By coppering, in the manner described in the preceding examples, dyestuffs from the diazo-compound of column I and the azo-compound of column II of the following table:

| Example No. | I<br>Diazocompound | II<br>Azocompound |
|---|---|---|
| 4 | {width=1} C—C—NH₂, CH₃—N, C=O, N, CH₃ (phenyl) | OH quinolone, O=, N, CH₃ |
| 5 | H₃C—C—C—NH₂, H₃C—N, C=O, N, (2-methyl-6-chlorophenyl) | OH quinolone, O=, N, CH₃ |
| 6 | H₃C—C—C—NH₂, H₃C—N, C=O, N, (phenyl) | OH quinolone with Cl, O=, N, CH₃ | dyestuff copper complexes having properties very similar to those of the preceding examples are obtained.

1 - (2′ - methyl - 6′ - chlorophenyl) - 2:3 - dimethyl-4-amino-pyrazoline-one-(5) can be manufactured thus:
1 - (2′ - methyl - 6′ - chlorophenyl) - 3 - methylpyrazolone-(5) is converted into 1-(2′-methyl-6′-chlorophenyl)-2:3-dimethyl-pyrazoline-one-(5) by being heated for 20 hours at 170° C. with the calculated amount of dimethyl sulfate. The resulting product is nitrosated in the 4-position in a hydrochloric acid solution at 0° C. by slowly adding dropwise the calculated amount of 4N-sodium nitrite solution. Without intermediate isolation, the greenish blue nitroso compound is reduced to the practically colorless 1 - (2′ - methyl - 6′ - chlorophenyl) - 2:3-dimethyl-4-amino-pyrazoline-one-(5) by adding acetic acid and zinc dust.

1-methyl-4-hydroxy-6-chloroquinolone-(2) can be prepared in the following manner:

N-methyl-5-chloranthranilic acid, obtained from 2:5-dichlorobenzoic acid and monomethylamine in the presence of copper hydroxychloride, is converted into the desired compound of the formula

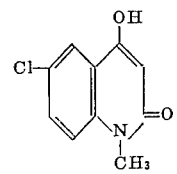

by prolonged boiling with a mixture of glacial acetic acid and acetanhydride.

Example 7

1 part of the dyestuff-copper complex obtained as described in Example 3 is dissolved in 5000 parts of water with the addition of 5 parts of acetic acid of 40% strength. 100 parts of boiled polyacrylonitrile staple fiber yarn are immersed in this dyebath, the temperature is raised to the boil within 15 minutes and dyeing is performed for 1 hour. The dyeing is then rinsed and dried. A yellow dyeing of very good fastness properties results.

What is claimed is:

1. A water-soluble copper complex, in which one copper atom is bound in complex union with one mol of a monoazo-dyestuff free from acid groups imparting solubility in water, of the formula

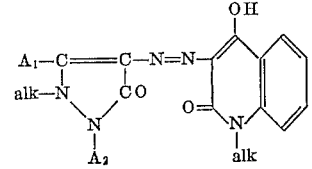

in which A₁ and A₂ each represents a member selected from the group consisting of lower alkyl and benzene radicals, but at least one of A₁ and A₂ being lower alkyl, and each "alk" represents a lower alkyl group.

2. A water-soluble copper complex, in which one copper atom is bound in complex union with one mol of a monoazo-dyestuff free from acid groups imparting solubility in water, of the formula

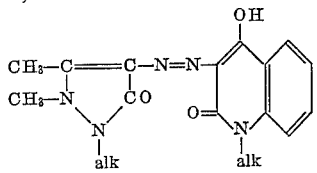

in which each "alk" represents a lower alkyl group.

3. A water-soluble copper complex, in which one copper atom is bound in complex union with one mol of a monoazo-dyestuff free from acid groups imparting solubility in water, of the formula

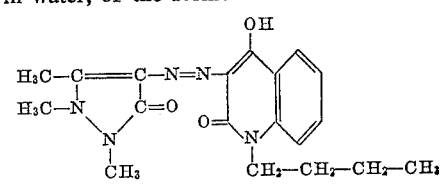

4. A water-soluble copper complex, in which one copper atom is bound in complex union with one mol of a monoazo-dyestuff free from acid groups imparting solubility in water, of the formula

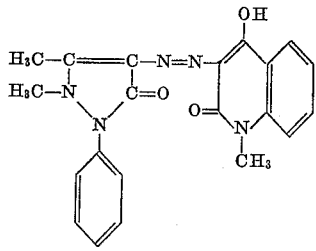

5. A water-soluble copper complex, in which one copper atom is bound in complex union with one mol of a monoazo-dyestuff free from acid groups imparting solubility in water, of the formula

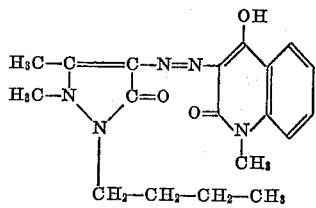

References Cited in the file of this patent

UNITED STATES PATENTS

| | | |
|---|---|---|
| 2,446,662 | Nies | Aug. 10, 1948 |
| 2,883,374 | Enders | Apr. 21, 1959 |

UNITED STATES PATENT OFFICE
CERTIFICATE OF CORRECTION

Patent No. 2,993,884                      July 25, 1961

Rudolf Ruegg et al.

It is hereby certified that error appears in the above numbered patent requiring correction and that the said Letters Patent should read as corrected below.

Column 1, line 27, strike out "with a 4-hydroxyquinolone-(2)." and insert the same after formula (2); column 2, lines 15 to 21, the formula should appear as shown below instead of as in the patent:

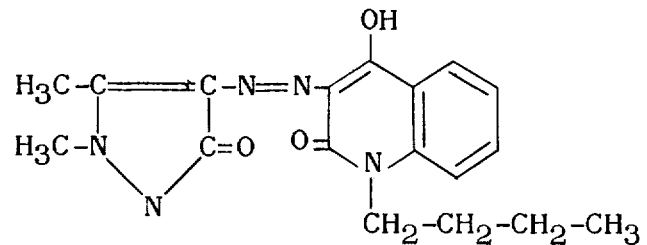

Signed and sealed this 20th day of February 1962.

(SEAL)
Attest:

ERNEST W. SWIDER                          DAVID L. LADD
Attesting Officer                       Commissioner of Patents